US011590817B1

(12) United States Patent
Juriga (10) Patent No.: US 11,590,817 B1
(45) Date of Patent: Feb. 28, 2023

(54) STABILIZER BAR BUSHING (71) Applicant: Zhongli North America Inc., Troy, MI (US)

(72) Inventor: Dean Juriga, Lake Orion, MI (US)

(73) Assignee: Zhongli North America Inc., Troy, MI (US)

( * ) Notice: Subject to any disclaimer, the term of this patent is extended or adjusted under 35 U.S.C. 154(b) by 0 days.

(21) Appl. No.: 17/903,652

(22) Filed: Sep. 6, 2022

Related U.S. Application Data (60) Provisional application No. 63/241,165, filed on Sep. 7, 2021.

(51) Int. Cl.
*B60G 11/20* (2006.01)
*B60G 21/02* (2006.01)

(52) U.S. Cl.
CPC ............ *B60G 11/20* (2013.01); *B60G 21/026* (2013.01); *B60G 2204/1222* (2013.01); *B60G 2204/41* (2013.01); *B60G 2204/82* (2013.01)

(58) Field of Classification Search
CPC ................... B60F 11/20; B60G 21/026; B60G 2204/1222; B60G 2204/41; B60G 2204/82
USPC .................................................. 280/124.106
See application file for complete search history.

(56) References Cited

U.S. PATENT DOCUMENTS

| 6,123,352 A | 9/2000 | Muzio |
| 6,241,225 B1 | 6/2001 | Krause |
| 6,755,404 B1 * | 6/2004 | Lefferts ................. F16F 1/3835 267/281 |
| 8,424,891 B2 | 4/2013 | Nagai et al. |
| 9,981,524 B2 * | 5/2018 | Matsumura ........... F16F 1/3821 |
| 11,135,891 B2 * | 10/2021 | Matsushita ........... F16F 1/3735 |
| 11,235,636 B1 * | 2/2022 | Swift ................. B60G 21/0551 |

(Continued)

FOREIGN PATENT DOCUMENTS

| EP | 0381945 A2 | 8/1990 |
| EP | 1391333 A2 * | 2/2004 ......... B60G 21/0551 |

(Continued)

OTHER PUBLICATIONS

Kenworth, Polyurethane AG100 Sway Bar Bushings K066-58 PL1008 K066-449, Ebay listing: https://tinyurl.com/7vv5b7w.

*Primary Examiner* — Paul N Dickson
*Assistant Examiner* — Caitlin Anne Miller
(74) *Attorney, Agent, or Firm* — Endurance Law Group PLC (57) ABSTRACT A cantilever bushing assembly anchors the central torsional section of a vehicular stabilizer bar in a cantilevered manner relative to a vehicle understructure. The bushing assembly comprises a bracket having a pocket centered on a pocket axis that coincides with a longitudinal axis of the stabilizer bar. Two plastic outer cans are cooperatively slidable into the pocket. Each outer can has an anti-rotation lobe received in respective keyways formed in the pocket. A rubber buffer is bonded to each outer can. Each rubber buffer has a frusto-cylindrical inner bearing surface that forms an arcuate portion of an interior bushing diameter. The inner bearing surface is post-vulcanization bonded to the central torsional section of the stabilizer bar. An arched rate plate is embedded within each rubber buffer. The rubber buffers compress in the area of the inner bearing surfaces and constrict about the central torsional section of the stabilizer bar.

20 Claims, 8 Drawing Sheets

(56) References Cited

U.S. PATENT DOCUMENTS

| | | |
|---|---|---|
| 11,260,713 B2 | 3/2022 | Hosoda |
| 2004/0113337 A1* | 6/2004 | Landry, Jr. ............ F16F 1/3873 |
| | | 267/152 |
| 2006/0091595 A1* | 5/2006 | Hayashi ................. F16F 1/371 |
| | | 267/276 |
| 2006/0131800 A1 | 6/2006 | Hori et al. |
| 2018/0141402 A1* | 5/2018 | Oh ..................... B60G 21/0551 |
| 2019/0242454 A1 | 8/2019 | Nakamaru et al. |

FOREIGN PATENT DOCUMENTS

| | | |
|---|---|---|
| KR | 101832153 B1 * | 2/2018 |
| KR | 101832153 B1 | 2/2018 |
| WO | 2022023364 A1 | 2/2022 |
| WO | WO-2022023364 A1 * | 2/2022 |

\* cited by examiner

STABILIZER BAR BUSHING

CROSS REFERENCE TO RELATED APPLICATIONS

This application claims priority to Provisional Patent Application U.S. Ser. No. 63/241,165 filed on Sep. 7, 2021, the entire disclosure of which is hereby incorporated by reference and relied upon.

BACKGROUND OF THE INVENTION

Field of the Invention. The invention relates generally to a bushing for a vehicular suspension system, and more particularly to a cantilever style bushing assembly for an anti-sway or stabilizer bar.

Description of Related Art. The suspension system of a motor vehicle typically includes at least one stabilizer bar, sometimes referred to as an anti-sway bar or anti-roll bar. The stabilizer bar transfers forces from one side of a vehicle to the other during uneven suspension travel. The most common situation is during a turning motion of the vehicle that occurs at speed such as a lane change or during cornering at an intersection. In these cases, the inside wheel moves downward (away from the wheel well) while the outside wheel moves upward (into the wheel well). This creates a vehicle "roll" condition. The stabilizer bar transfers wheel forces from the outside wheel to the inside wheel to improve vehicle stability, thus minimizing the "roll".

Figure 1:
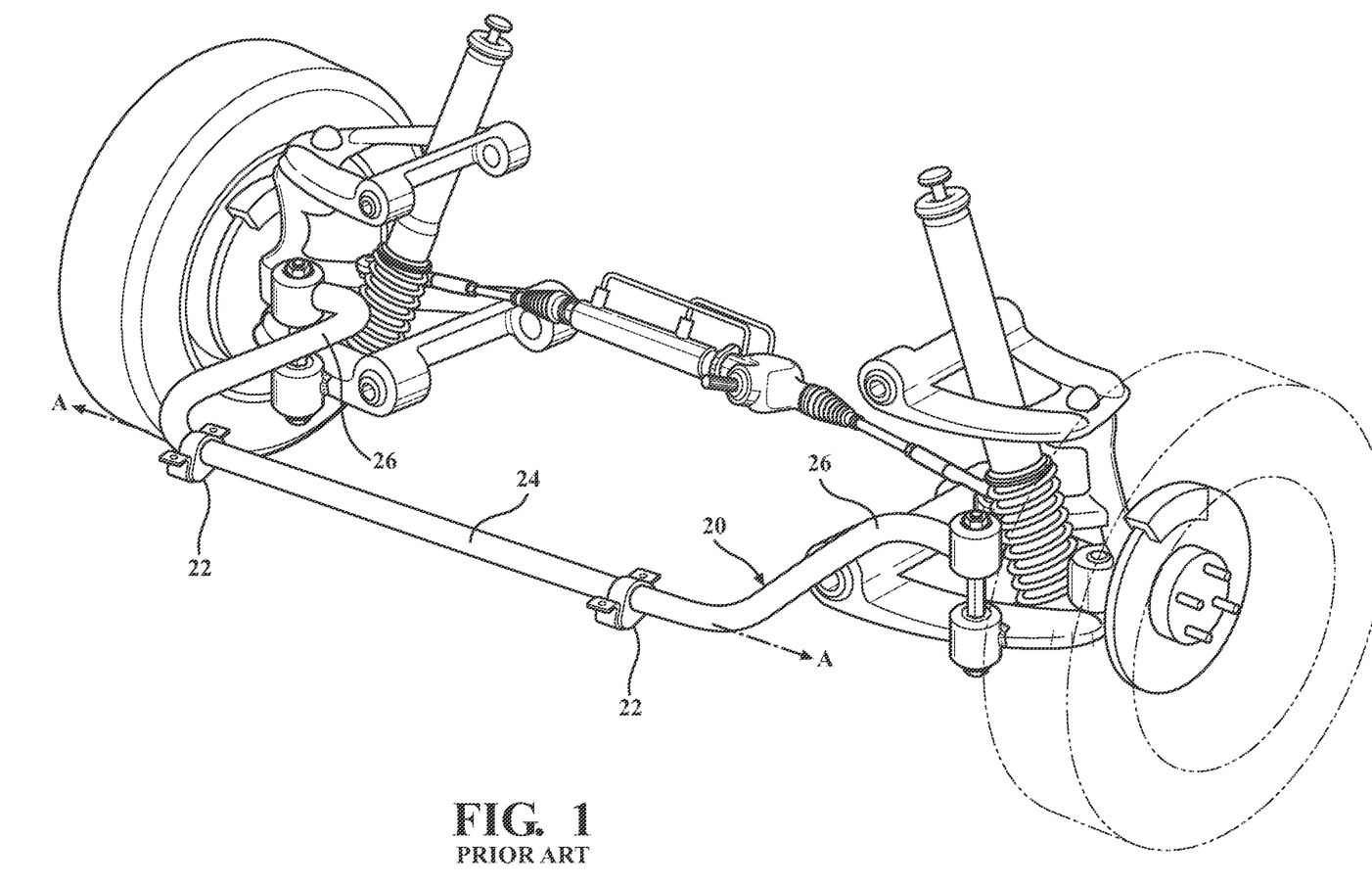
FIG. 1 is a simplified and fragmentary perspective view of an exemplary vehicular front end suspension system.

Stabilizer bars are typically configured as torsion bars having a central torsional section between opposing control ends. The control ends are associated with respective wheels. The central torsional section extends along a generally linear longitudinal axis that is transverse oriented relative to the vehicle fore and aft directions. The central torsional section has a generally circular cross-section centered about the longitudinal axis, which is attached to the vehicle frame via a pair of bushings captured in respective brackets. Each bushing supports the stabilizer bar and provides the mounting interface of the bar to the vehicle frame. FIG. 1 offers a simplified depiction of an exemplary suspension system for a motor vehicle, in which the central torsional section 24 of a stabilizer bar 20 is shown supported in a pair of bushings 22.

Stabilizer bar bushings 22 must be designed to address several functional requirements, which may include: a) acting as a bearing to allow some freedom of motion; b) providing a means to attach the stabilizer bar 20 to the vehicle frame; c) acting as an additional linear and torsional spring to improve stabilizer bar 20 efficiency; d) being free of self-generated noise; and e) meeting customer fatigue requirements.

During the freedom of motion mentioned above, the stabilizer bar 20 bends and twists, imparting both radial forces and torque through the bushings 22. The desired cross-car force transfer can only occur if the stabilizer bar 20 is supported to the vehicle frame at mounting points which adequately manage the foreseeable forces and torque. Rubber buffers in the bushings 22 are usually used at these mounting points to allow some freedom of motion and act as bearings. The elastic nature of the rubber buffer prevents the bar 20 from binding up which could otherwise lead to fatigue fractures or reduced efficiency of the bar 20.

Consider that when the stabilizer bar twists, torque is transferred to the bushings 22 through the metal-to-rubber interface between the stabilizer bar and the rubber buffer. In applications where the rotation angle is high (e.g., >30 degrees in both directions), slip can occur at this interface unless there is sufficient resistance. Slippage is of course dependent on the coefficient of friction. Some applications use an adhesive bond at the metal-to-rubber interface to prevent slip. Not only does a slippage along a metal-to-rubber interface cause a sudden decrease in torsional stiffness, but substantial unwelcome noise is also produced.

Most stabilizer bar bushings 22 are mounted from both sides directly to a vehicular crossmember or frame so that the forces that pass through the bar 20 and rubber buffers are applied to a rigid structure of the vehicle, as illustrated in FIG. 1. The bushing 22 centerline is often mounted directly in line to the frame and configured so that direct compression of the rubber buffer is achieved with the clamping force of the bracket mounting bolts. That is to say, the rubber buffer is advantageously squeezed around the stabilizer bar 20 by the same bolts used to attach the bushings 22 to the vehicle frame or other structural portion of the undercarriage. A sufficiently tight metal-to-rubber interface is easily achieved by the clamping force of the bracket mounting bolts in traditional designs where the bracket mounting bolts clamp the rubber buffer from both sides directly to the vehicular frame. That is to say, the clamping pressure creates sufficient friction in most cases to resist slippage. If/when slippage does occur at high rotation angles, the system is resigned to suffer a sudden decrease in torsional stiffness and likely also unwelcome noise. In some cases, the slippage can be controlled to a degree with the incorporation of a PTFE coated fabric liner, or low friction rubber.

In a limited number of vehicles, however, the packaging environment prohibits conventional attachments (FIG. 1) using bracket mounting bolts clamping on both sides of the rubber buffer. In these special cases, the bushing must be cantilevered from the frame mounting. Cantilevered mounting arrangements present particular engineering difficulties, because the rubber buffer of the bushing must be configured to what can fit in the environment and cannot rely on the bracket mounting bolts to supply the compression needed for a tight metal-to-rubber interface. In these cases, tight metal-to-rubber interfaces between stabilizer bar and bushing must be achieved with additional design features. Common applications include the use of a rubber-to-metal bonding agent.

The general characteristic of a bonded metal-to-rubber interface is that resistance to slip is greatly increased. Without any slip, all the twist is directly transferred to the full rubber section, thus adding cyclic fatigue exposure to the design. Prior art design solutions that bond the rubber bushing to the stabilizer bar 20 require the rubber to sustain the highest torsional fatigue. Various solutions have been able to achieve high radial stiffness by using thin rubber buffers, rate plates or radial precompression and confinement of the rubber buffer to prevent displacement but, but unfortunately have not been able to accommodate high strain at angular displacements over 30 degrees. As those of skill in the art will appreciate, in such cases the resulting high cyclic strain compromises fatigue life requirements for many vehicles and/or is ill-suited to accommodate a small package envelope.

Some prior art examples of cantilever design stabilizer bar bracket assemblies may be found in the Mercedes SL, Mercedes ML/GL and Porsche 968. Careful examination of these prior art cantilever bracket assemblies will show most are susceptible to sudden decreases in radial and/or torsional stiffness at high articulation angles, producing noise at high articulation angles, are expensive to manufacture, difficult to install and/or vulnerable to cyclic fatigue.

Mold-bonding is the technique of achieving an adhesively bonded metal-to-rubber interface concurrently with the rubber during an over-molding process. Typically, the outer metal surface of the stabilizer bar is coated with a suitable bonding agent, such as a heat activated adhesive or epoxy like those marketed by LORD Corporation/Parker-Hannifin Corporation. The coated portion of the stabilizer bar is placed into an injection mold, into which pressurized rubber is injected. Once the adhesive cures, the rubber is said to be "mold-bonded" to the outer surface of the stabilizer bar. Vulcanization of the rubber occurs either during the adhesive curing process or after the adhesive bond is cured. Since the components are permanently attached, the rubber stiffness directly contributes to the torsional and radial stiffness of the stabilizer bar 20.

One prior art example of a cantilevered bracket utilizing a mold-bonded metal-to-rubber interface can be found in the Tesla Model X. The mold-bonded rubber buffer of the Tesla Model X cantilevered design is subsequently bonded inside its aluminum bracket. During manufacture, the entire aluminum bracket is placed in a mold and the rubber is vulcanized to the bracket. In this case, vulcanization of the rubber occurs after the adhesive bond is fully cured. The stabilizer bar 20 of the Tesla Model X can be smaller and yet achieve the same vehicle roll stiffness as other prior art designs that allow slip between the bar 20 and the bushing 22. However, this design is expensive to manufacture and difficult to install.

While effective at improving metal-to-rubber interface, mold-bonding has certain disadvantages. One disadvantage is that is it impossible to pre-load, i.e., pre-compress, the rubber buffer before mold-bonding. This inability to pre-load removes from the designer the option of fine-tuning the compression characteristics of the metal-to-rubber interface. It is known that radial precompression of the rubber bushing can be used to effectively achieve higher radial stiffness and prevent displacement. The inability to pre-load also limits the quality of the metal-to-rubber interface to whatever pressures can be achieved during the injection molding process. It is well-known that bond quality is directly proportional to clamping pressure during the curing phase. Generally speaking, greater bond quality is achieved with the higher clamping pressures. Another disadvantage of the mold-bonding technique is that rubber is injection-molded at very high temperatures. As the rubber cools and solidifies, a degree of shrinkage occurs. Shrinkage has the undesirable effect of reducing compression in the rubber buffer, thereby working further against the first shortcoming, which is the inability to pre-load the rubber.

Thus, prior art bushing assemblies that must be carried in cantilever brackets are faced with this engineering challenge: how to optimize the metal-to-rubber interface between the rubber buffer and the stabilizer bar 20 while enabling high articulation (e.g., >30 degrees in both directions) and high radial stiffness (e.g., >10,000 N/mm) without slippage or noise? There is therefore a need in the art for an improved stabilizer bar bracket assembly of the cantilever type capable of sustaining high articulation, high radial stiffness and meanwhile producing little-to-no objectionable noise and that contributes to the torsional and radial stiffness of the stabilizer bar 20. While various prior art designs have been able to address one or at most two of these criteria, none have heretofore been able to concurrently satisfy all of these important factors.

BRIEF SUMMARY OF THE INVENTION

According to a first aspect of this invention, a cantilevered bushing assembly for a vehicular stabilizer bar comprises a bracket extending between a head and a foot. The bracket head has a pocket generally centered on a pocket axis. At least one outer can is slidable into an operative position inside the pocket. The outer can is generally arched about the pocket axis with circumferentially spaced-apart long edges opposing one another to form an annulus. The outer can has a leading end and a longitudinally spaced trailing end. The outer can has an outer surface and a frusto-cylindrical inner surface centered about the pocket axis. A rubber buffer is associated with the outer can. The rubber buffer has an outer bonded surface that is directly affixed to the inner surface of the outer can. The rubber buffer is generally arched about the pocket axis with circumferentially spaced-apart springer ends. The rubber buffer has a frusto-cylindrical inner bearing surface centered about the pocket axis; the inner bearing surface forms an arcuate portion of an interior bushing diameter. The pocket has a cylindrical bearing surface interrupted by at least one radially-outwardly bulging keyway. An anti-rotation lobe is formed along the outer surface of the outer can. The anti-rotation lobe is received in the keyway.

According to a second aspect of this invention, a cantilevered bushing assembly for a vehicular stabilizer bar comprises a bracket extending between a head and a foot. The head has a pocket generally centered on a pocket axis. The pocket has two diametrically opposed keyways. A pair of outer cans are slidable into an operative position inside the pocket. Each outer can is generally arched about the pocket axis with circumferentially spaced-apart long edges opposing one another to form a segmented annulus. Each outer can has a leading end and a longitudinally spaced trailing end. Each outer can has an outer surface and a frusto-cylindrical inner surface centered about the pocket axis. Each outer can has an anti-rotation lobe received in a respective one of the keyways. A rubber buffer is associated with each outer can. Each rubber buffer has an outer bonded surface that is directly affixed to the inner surface of the associated outer can. Each rubber buffer is generally arched about the pocket axis with circumferentially spaced-apart springer ends. Each rubber buffer has a frusto-cylindrical inner bearing surface centered about the pocket axis; the inner bearing surface forms an arcuate portion of an interior bushing diameter. A rate plate is embedded within each rubber buffer. The rate plate is generally arched about the pocket axis. The intersection of the inner bearing surface and the springer ends establishes a minor arch that spans greater than 180 degrees. The intersection of the outer bonded surface and the springer ends establishes a major arch that spans less than 180 degrees. The major arch generally coincides with the long edges of the associated outer can.

According to a third aspect of this invention, a combination stabilizer bar and cantilever bushing assembly is provided. The combination comprises a stabilizer bar having a central torsional section between opposing control ends. The central torsional section extends along a generally linear longitudinal axis. The central torsional section has a generally circular cross-section that is centered about the longitudinal axis. At least one cantilever bushing assembly is disposed along the central torsional section of the stabilizer bar, and is configured to anchor the central torsional section in a cantilevered manner relative to a vehicle understructure. The bushing assembly comprises a bracket that extends between a head and a foot. The bracket has opposite faces. The head has a pocket that is generally centered on a pocket axis. The pocket axis generally coincides with the longitudinal axis of the central torsional section. The pocket opens on each of the faces of the bracket to establish a through hole. The pocket has a cylindrical bearing surface interrupted by a pair of diametrically opposed radially-outwardly bulging keyways. The foot establishes a generally flat mounting base. The foot has at least one mounting hole disposed therethrough and laterally offset from the pocket axis. The bracket is fabricated from a metallic material. Two outer cans are cooperatively slidable into the pocket. Each outer can is generally arched about the pocket axis with circumferentially spaced-apart long edges opposing one another to form a segmented annulus. Each outer can has a leading end and a longitudinally spaced trailing end. Each outer can has an outer surface and a frusto-cylindrical inner surface centered about the pocket axis and terminating at the long edges. Each outer can has an anti-rotation lobe received in a respective one of the keyways. The outer can is fabricated from a rigid plastic material. A rubber buffer is associated with each outer can. Each rubber buffer has an outer bonded surface directly affixed to the inner surface of the associated outer can. Each rubber buffer has a frusto-cylindrical inner bearing surface centered about the pocket axis. The inner bearing surface forms an arcuate portion of an interior bushing diameter. The interior bushing diameter is preferably equal to or smaller than the shaft diameter of the torsional section of the stabilizer bar. Each rubber buffer is generally arched about the pocket axis with circumferentially spaced-apart springer ends. The intersection of the inner bearing surface and the springer ends establishes a minor arch that spans greater than 180 degrees. The intersection of the outer bonded surface and the springer ends establishes a major arch that spans less than 180 degrees. The major arch generally coincides with the long edges of the associated outer can. A rate plate is embedded within each rubber buffer. The rate plate is generally arched about the pocket axis.

The claimed invention provides for an improved stabilizer bar bracket assembly of the cantilever type capable of sustaining high articulation (e.g., >30 degrees in both directions), high radial stiffness (e.g., >10,000 N/mm) and that produces little-to-no objectionable noise. Prior art designs could not achieve high angle combined with high radial stiffness combined with bonding for noise abatement. The present invention is unique in that, as a cantilever design, it incorporates a high radial stiffness in a construction that is press fit into the bracket. Prior art press fit designs utilized steel brackets with very short cantilevers and previous aluminum designs used low stiffness bushings that were mold bonded to the bracket and did not allow for modular assembly. This present invention offers a unique cantilevered design having a small package envelope for the rubber buffer. The present invention utilizes an annular bushing assembly that, due to its unique design features, overcomes the problems of high torsional strain and facilitates assembly into the bracket.

An advantage of the present invention is that a bond is made at the metal-to-rubber interface between stabilizer bar and rubber buffer with post-vulcanization bonding methods. That is to say, the rubber composition of the rubber buffer is vulcanized prior to assembly with the stabilizer bar. As such, it possible to pre-compress the rubber buffer before bonding. Radial pre-loading of the rubber bushing can be used to achieve higher radial stiffness and prevent displacement. Bond quality is directly proportional to clamping pressure during the curing phase, the quality of the metal-to-rubber interface can be controlled by pre-compressing the already vulcanized rubber buffer against the surface of the stabilizer bar. Additionally, little-to-no shrinkage occurs during the bonding process because the rubber buffer is already vulcanized.

The design of the present invention successfully prevents noises of the type characteristic of many prior art designs having rubber-to-metal interfaces. Moreover, the present invention is particularly unique in that it represents a press fit bushing concept in a more efficient package that can, if desired, can be easily configured to enable the installer to change the bushing assembly to suit the stabilizer bar. Prior art designs that use rubber buffers that are mold bonded to the bracket cannot adapt to changes in stabilizer bar sizes. The press fit bushing concept of this present invention provides substantially enhanced design flexibility compared with many prior art designs.

The present invention is novel in its cantilever design that uses an outer can combined with features that enable the bushing assembly to stay in position when exposed to vehicle loading. The outer can has an anti-rotation lobe that acts as a keyway to prevent torsional slip. This "keyed" design solves the traditional problem of relying on friction to prevent the rubber buffer from rotating inside the bracket.

Prior designs were not capable of sustained operation at high torsional angles. The present invention succeeds where these prior designs failed. Testing has shown the design of this invention capable of achieving specifications significantly better than can be achieved with any prior art designs.

BRIEF DESCRIPTION OF THE SEVERAL VIEWS OF THE DRAWINGS

These and other features and advantages of the present invention will become more readily appreciated when considered in connection with the following detailed description and appended drawings, wherein.

DETAILED DESCRIPTION OF THE INVENTION

Referring again to FIG. 1, an exemplary stabilizer bar 20 is depicted. Those of skill in the art will appreciate that the specific design and configuration of the stabilizer bar 20 will adapt to suit the intended application. The stabilizer bar 20 has a central torsional section 24 between opposing control ends 26. The central torsional section 24 extends along a generally linear longitudinal axis A that is oriented transverse to the fore- and aft directions of the motor vehicle to which it is coupled. In the example shown, central torsional section 24 has a generally circular cross-section centered about the longitudinal axis A that establishes a generally consistent shaft diameter along the length thereof. In some contemplated embodiments, however, the central torsional section 24 may have non-round cross-sectional shapes. The concepts of this invention are readily adaptable to stabilizer bars 20 of widely varying design.

Referring now to FIGS. 2-13, wherein like numerals indicate like or corresponding parts throughout the several views, a novel cantilever bushing assembly according to one contemplated embodiment is generally shown at 28. At least one such cantilever bushing assembly 28 is disposed along the central torsional section 24 of the stabilizer bar 20. Most commonly, however, two cantilever bushing assemblies 28 will be disposed along the central torsional section 24 of a stabilizer bar 20 at spaced-apart locations more or less like that shown for the prior art bushings 22 in FIG. 1. The purpose of the cantilever bushing assembly 28 is to anchor the central torsional section 24 relative to the vehicle understructure from one exclusive side of the longitudinal axis A. That is to say, the cantilever nature of the bushing assembly 28 is expressed in its attachment to the motor vehicle undercarriage on one lateral side only of the longitudinal axis A. In this manner, as perhaps best appreciated from FIGS. 2 and 3, the central torsional section 24 (shown in phantom lines) is supported entirely from one end of the bushing assembly 28.

The bushing assembly 28 comprises a housing-like bracket, generally indicated at 30. The bracket 30 is preferably fabricated from a sturdy metallic material, such as iron, steel, aluminum, or other suitable metals and alloys. In the illustrated examples, the bracket 30 takes the general shape of a teardrop that can be seen extending between a relatively large, rounded head 32 and a wedge-like foot 34. The head 32 of the bracket 30 has opposite faces 36.

A pocket 38 is formed in the head 32, preferably (but not necessarily) opening on each of the faces 36 to establish a through hole. In cases where the pocket 38 does not open through to both faces 36, it is contemplated that the pocket 38 could take the form of a blind hole or otherwise be stopped adjacent one of the faces 36. The pocket 38 is generally centered on a pocket axis P. When the bushing assembly 28 is assembled together with the stabilizer bar 20, the pocket axis P overlays, i.e., is generally coincident with, the longitudinal axis A of the central torsional section 24.

Figure 5:
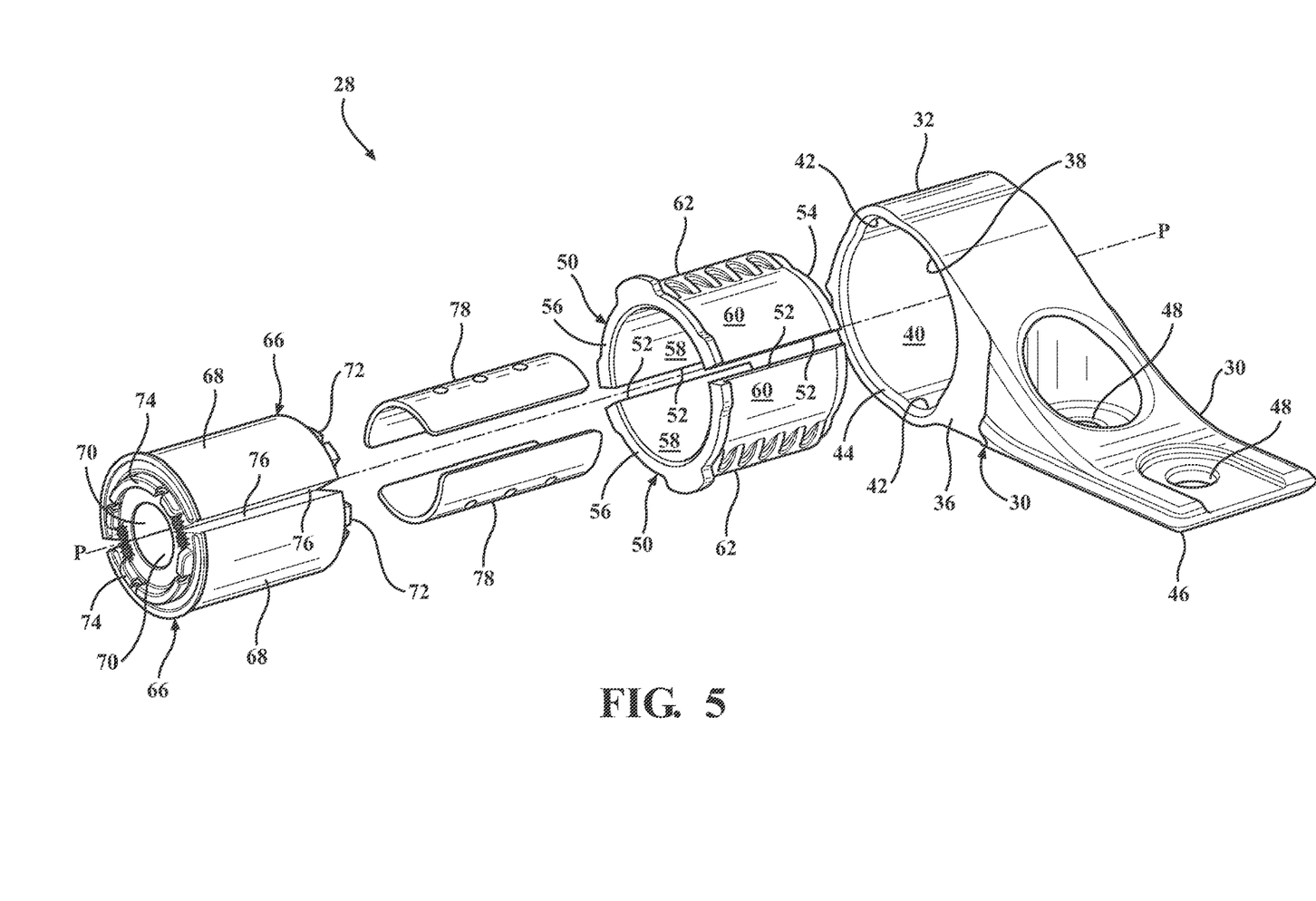
FIG. 5 is an exploded view of the cantilever bushing assembly of FIG. 2.

The pocket 38 has a cylindrical bearing surface 40 that is interrupted by at least one radially-outwardly bulging keyway 42, as best seen in FIG. 5. In the illustrated examples, however, a pair of diametrically opposed keyways 42 are incorporated into each bearing surface 40. Although each keyway 42 is depicted having a smoothly concave shape and extending linearly parallel to the pocket axis P, alternative shapes and/or skewing are also possible. The purpose of the keyways 42 will be described subsequently.

As also seen in FIG. 5, a chamfer 44 is formed at the interface of the pocket 38 and at least one of the faces 36. In cases where the pocket 38 is a through hole, a chamfer 44 could be placed on both faces 36 or only one 1 face 36 if assembly protocols limit insertion of the interior bushing components from one side only. Forming chamfers 44 on both faces 36 of the head 32 is preferred, however, to enable press fitting the interior bushing components from opposite directions which could be useful to minimize lateral walkout. Naturally, in cases where the pocket 38 is not a through hole, the chamfer will appear only on the one face through which it opens.

The foot 34 establishes a generally flat mounting base 46 for the cantilever bushing assembly 28. As previously mentioned, the cantilever nature of the bushing assembly 28 is a function of the foot 34 being located exclusively to one lateral side of the longitudinal axis A. See also FIGS. 2 and 3. The foot 34 has at least one mounting hole 48 disposed therethrough. The mounting hole 48 is laterally offset from the pocket axis P to accomplish cantilever support of the stabilizer bar 20. In the illustrated examples, however, the foot 34 is provided with two such mounting holes 48 that extends generally perpendicular to the pocket axis P. In some contemplated embodiments, the foot 34 may be fitted with three or more mounting holes 48. Each mounting hole 48 is offset from the pocket axis P toward the same lateral direction, thus further reinforcing the cantilever condition. Each mounting hole 48 may be formed with a countersink opposite the mounting base 46. The head of a suitable fastener (not shown) is cradled in each countersink and applies a normal force against the foot 34 with which to secure the cantilever bushing assembly 28 to the understructure of the motor vehicle.

Previous mention was made to interior bushing components that are inserted into the pocket 38. Such interior components include at least one outer can 50 that is slidable into an operative position inside the pocket 38. Preferably, although not necessarily, the outer can 50 is fabricated from a hard, durable, abrasion-resistant plastic material. It is contemplated that the outer can 50 can be a singular, circumferentially compressible member, in the shape of the letter "C." Preferably however, the outer can 50 is comprised of a plurality of independent slivers or segments that are capable of circumferential compressibility by nature of their independence. In the illustrated examples, two generally semi-circular outer cans 50 are utilized. The following descriptions are based on the illustrated embodiment comprised of two generally semi-circular outer cans 50. It must be understood, however, that adaptations that will be apparent to those of skill in the art must be applied to the outer can 50 and the other interior components yet to be described in cases where the outer can 50 is configured as a singular member or more than two independent segments.

Figure 2:
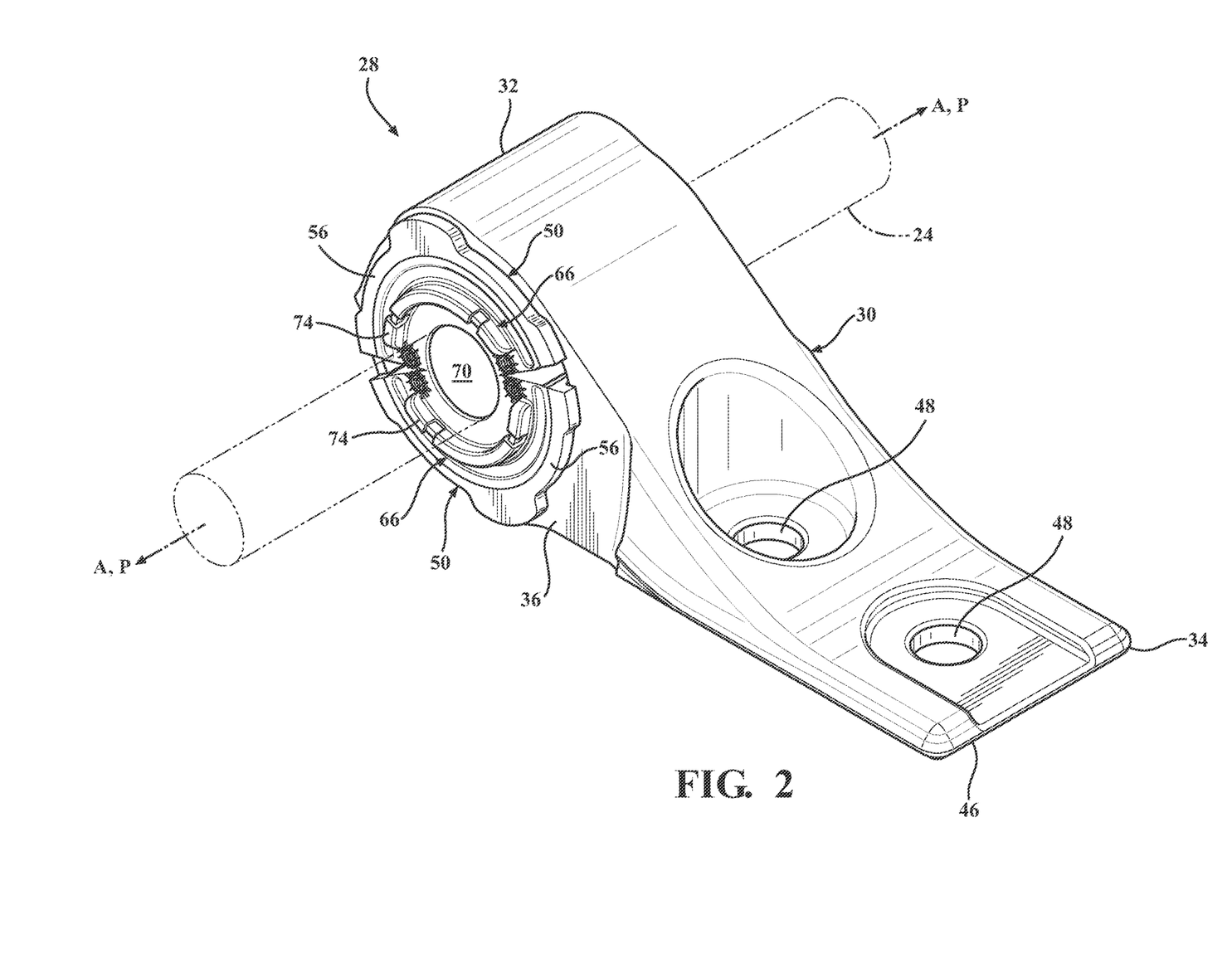
FIG. 2 is a perspective view of a cantilever bushing assembly according to an embodiment of the present invention.
Figure 3:
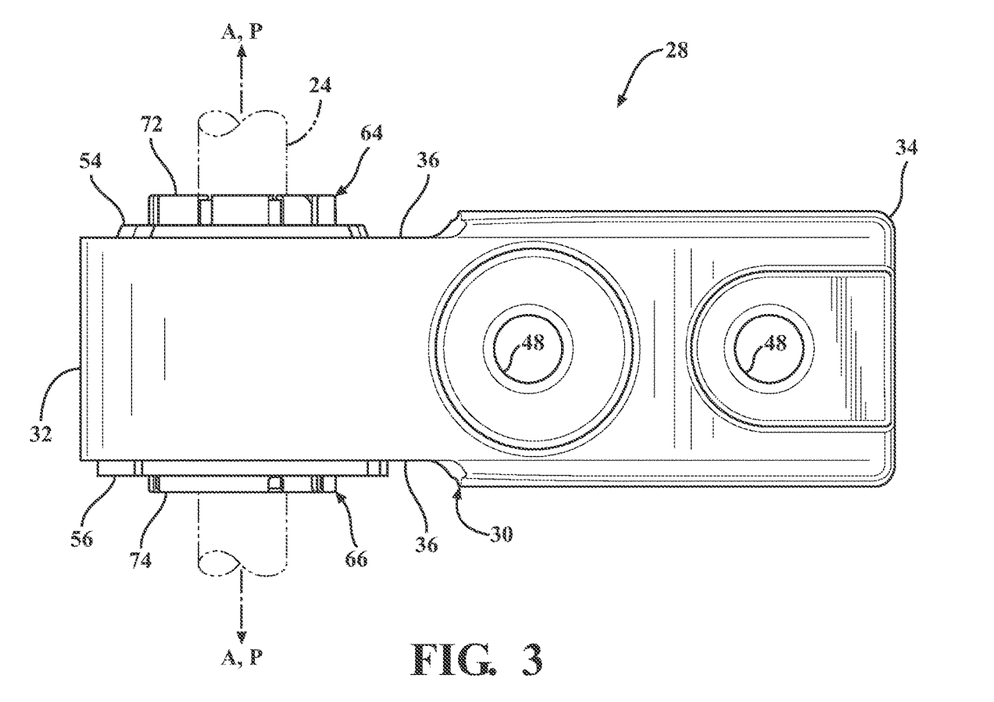
FIG. 3 is a top view of the cantilever bushing assembly of FIG. 2.
Figure 13:
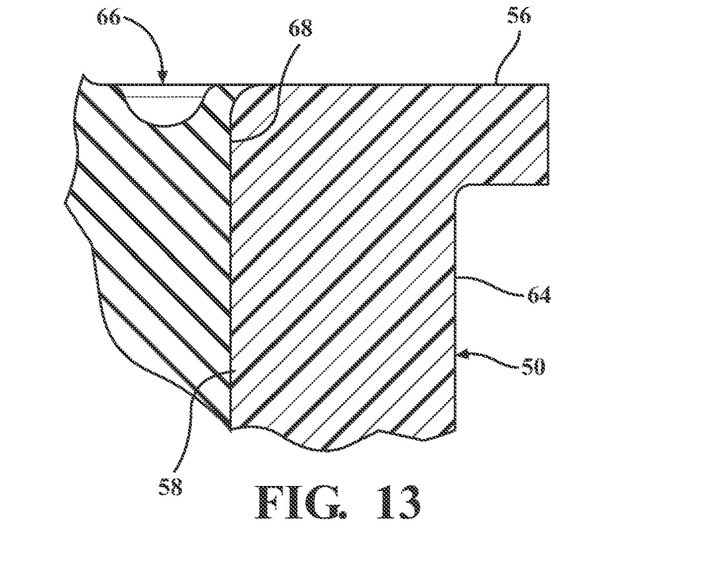
FIG. 13 is an enlarged view of the area circumscribed at 13 in FIG. 12.

Each outer can 50 is generally arched about the pocket axis P with circumferentially spaced-apart long edges 52 opposing one another to form a segmented annulus, as perhaps best appreciated from the view of FIG. 5. Each outer can 50 has a leading end 54 and a longitudinally spaced trailing end 56. The leading end 54 of the outer can 50 is preferably tapered or otherwise relived to facilitate insertion into the pocket 38. The trailing end 56 of the outer can 50 includes an outwardly extending flange adapted to directly abut the face 36 of the bracket 30 as shown in FIG. 2. FIG. 13 offers and enlarged view of the flange at the trailing end 56. As can therefore be appreciated, the pair of outer cans 50 arranged so as to form an annulus are insertable into the pocket 38 via the leading ends 54. Insertion of the outer cans 50 into the pocket 38 is eventually arrested when the flanges at the trailing ends 56 come into contact with the face 36 of the bracket head 32. In this manner, the outer cans 50 are seated inside the pocket 38.

Figure 6:
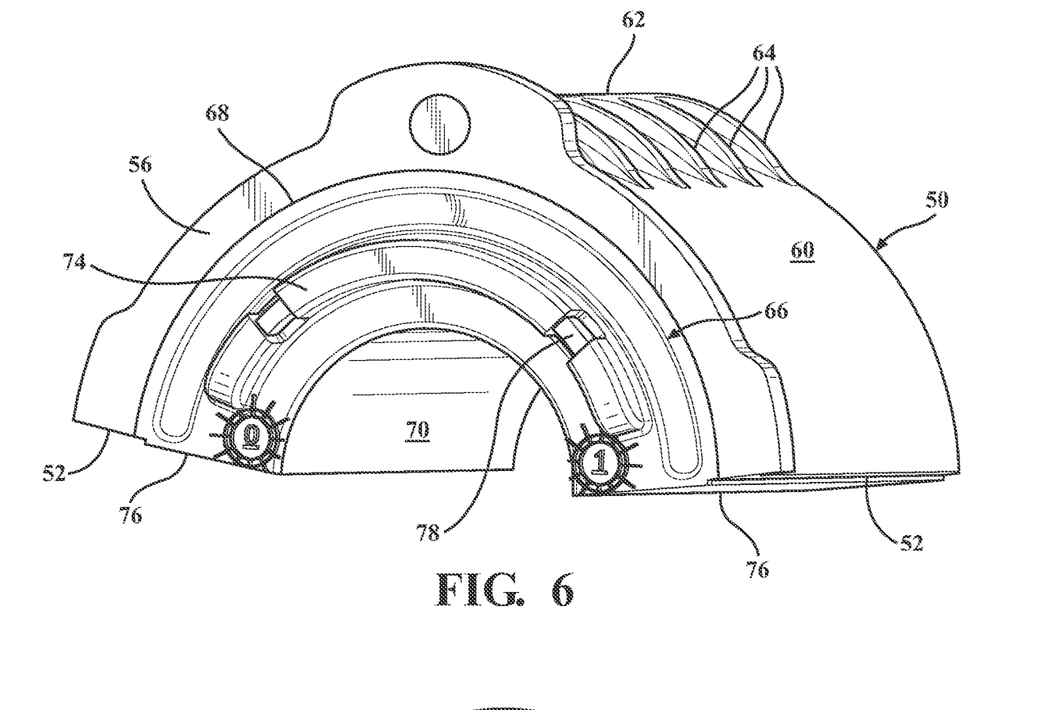
FIG. 6 is a perspective view of a combined outer can and rubber buffer according to an embodiment of the present invention.
Figure 7:
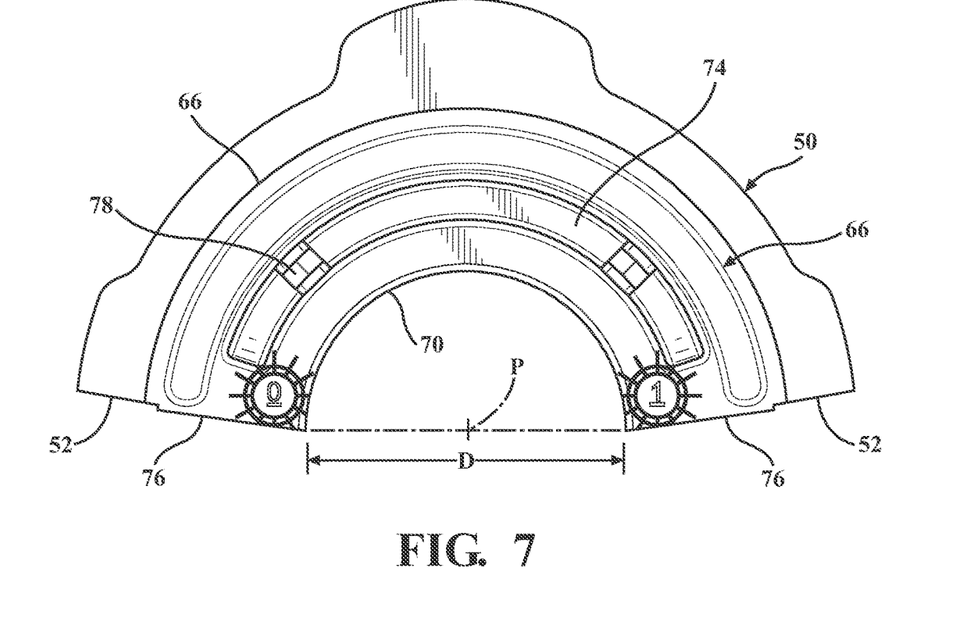
FIG. 7 is a front elevation view of the outer can and rubber buffer of FIG. 6.
Figure 8:
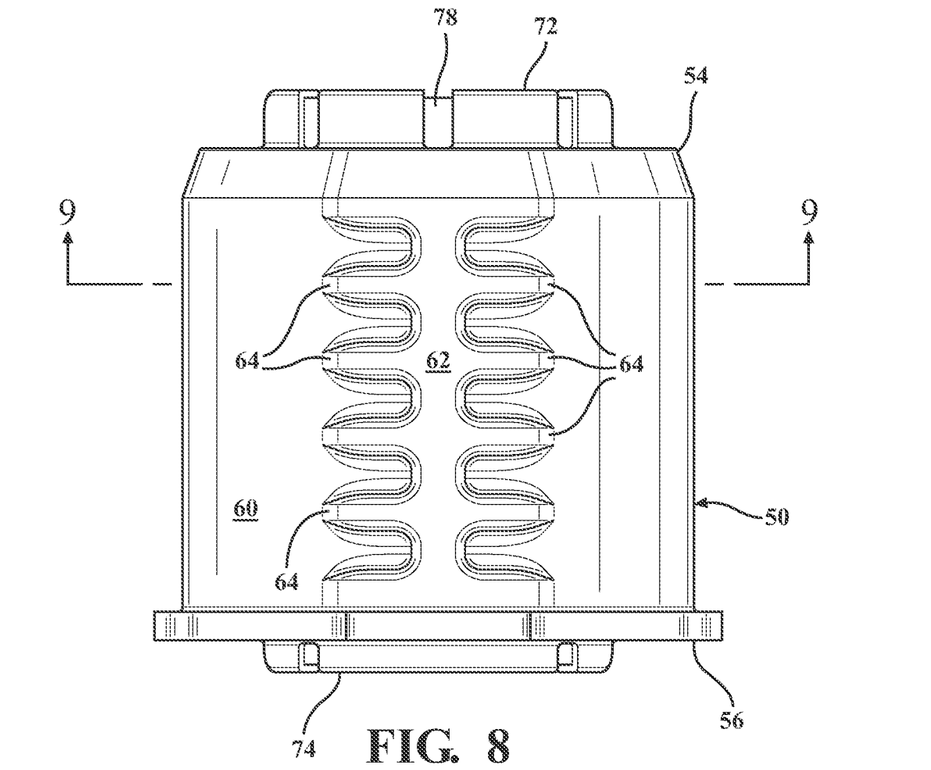
FIG. 8 is a top view of the outer can and rubber buffer of FIG. 6.
Figure 9:
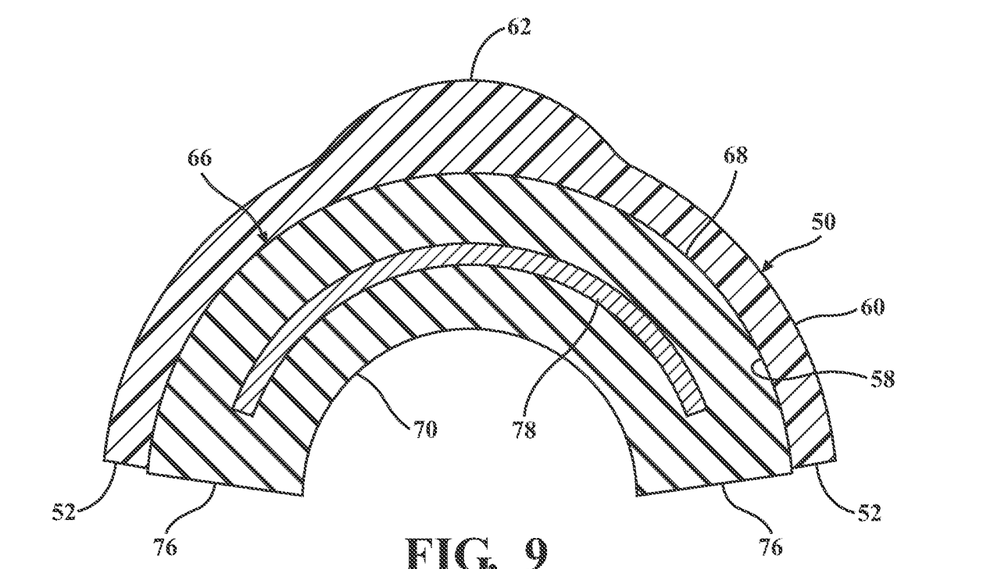
FIG. 9 is a cross-sectional view taken generally along lines 9-9 of FIG. 8.

Each outer can 50 has a frusto-cylindrical inner surface 58 centered about the pocket axis P and terminating at the long edges 52. The term "frusto-cylindrical" is adopted in lieu of "semi-cylindrical" to make clear that, at least in the illustrated examples, the inner surface 58 is not necessarily 180 degrees in arcuate measure. FIGS. 6, 7 and 9 offer perhaps the best illustration of this construction. Here, the inner surface 58 can be seen to span an arc of approximately 160 degrees. For purposes of this disclosure, the precise arcuate span is less relevant than the fact that the span is less than 180 degrees. A person of skill in the art will design the outer can 50 according to the dictates of the intended application, and in view of the clearance needed for rubber flow during assembly.

Likewise, each outer can 50 has an outer surface 60 that is more-or-less arcuate in shape. The outer surface 60 is configured to directly engage and seat against the interior of the pocket 38. An anti-rotation lobe 62 is formed along the outer surface 60 of at least one outer can 50. However, in the illustrated examples comprising multiple outer cans 50, each outer can 50 has one anti-rotation lobe 62. The anti-rotation lobe 62 is disposed centrally between the long edges 52, and has a ridge extends parallel to the pocket axis P. In other contemplated embodiments, the ridge could have a skew or helical slant relative to the pocket axis P if needed to match the configuration of the keyways 42. A plurality of spurs 64 extend laterally from the ridge. Adjacent the spurs separated by intervening draws to form the double-sided sawtooth design depicted in FIG. 8. The design of the anti-rotation lobe 62 with spurs enables better injection molding and cooling characteristics.

Each anti-rotation lobe 62 is received in a respective one of the keyways 42. As mentioned, the anti-rotation lobes 62 are shaped to mate with the keyways 42. During insertion of the outer cans 50 into the pocket 38, the anti-rotation lobes 62 register with respective keyways 42. When the outer cans 50 are fully seated in the pocket 38, the interlocking anti-rotation lobes 62 and keyways 42 prevent relative rotation between the outer cans 50 and the bracket 30. Whereas prior art designs may have avoided slippage inside the pocket 38 by way of a bonded interface or heavy compression, this present invention avoids slippage mechanically by way of the meshing anti-rotation lobes 62 and keyways 42.

Still further interior bushing components include rubber buffers 66. One rubber buffer 66 is associated with each outer can 50. Each rubber buffer 66 has an outer bonded surface 68 (FIG. 5) directly affixed to the inner surface 58 of the associated outer can 50 by mold bonding, post-vulcanization adhesive bonding, or any other suitable technique. Suitable bonding agents may include heat activated adhesives or epoxies like those marketed by LORD Corporation/Parker-Hannifin Corporation. The direct bonding prevents slippage between the outer bonded surface 68 of the rubber buffer 66 and the inner surface 58 of the outer can 50.

Figure 4:
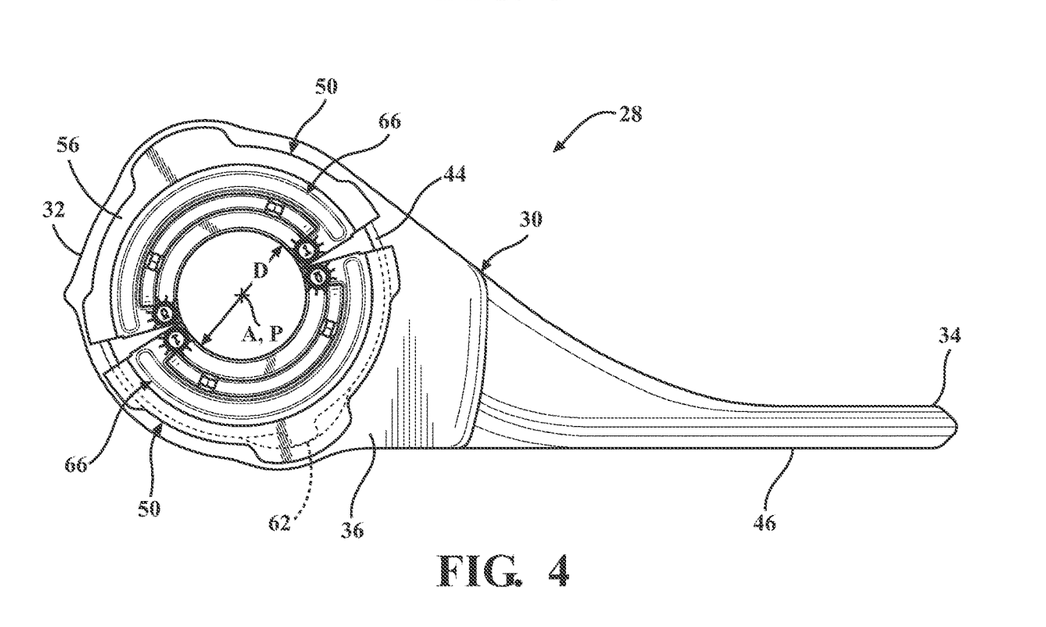
FIG. 4 is a front elevation view of the cantilever bushing assembly of FIG. 2.

Each rubber buffer 66 has an inner bearing surface 70 centered about the pocket axis P. The inner bearing surface 70 forms an arcuate portion of an interior bushing diameter D (FIG. 4). In FIG. 9, the inner bearing surface 70 can be seen to span an arc of approximately 180 degrees, however a person of skill in the art will design the inner bearing surface 70 according to the dictates of the intended application. Preferably, the interior bushing diameter D is either equal to or slightly smaller than the shaft diameter of the torsional section 24 of the stabilizer bar 20. In this way, the rubber buffers 66 will compress about the central torsional section 24 upon assembly.

Each rubber buffer 66 has a nose 72 proximate the leading end 54 of the associated outer can 50 and a tail 74 proximate the trailing end 56 of the outer can 50. In the illustrated examples, the nose 72 can be seen protruding from the leading end of the outer can 50. Likewise, the tail 74 is also visible protruding from the trailing end 56 of the outer can 50. These protruding nose 72 and tail 74 features are visible in FIGS. 3, 8, 10 and 12. The purpose of the protruding nose 72 and tail 74 will be described below.

Considering FIGS. 6, 7 and 9, each rubber buffer 66 is shown to be generally arched about the pocket axis P with circumferentially spaced-apart springer ends 76. The term springer is borrowed from the architectural reference pertaining to arches. In this vernacular, each springer end 76 is formed with a skewback. That is to say, the springer ends 76 are not co-planar with one another passing diametrically through the geometric center of the interior bushing diameter D. Rather, if the intersection of the inner bearing surface 70 and the springer ends 76 establishes a minor arch and the intersection of the outer bonded surface 68 and the springer ends 76 establishes a major arch, one can observe that the minor arch spans about (or slightly greater than) 180 degrees whereas the major arch spans noticeably less than 180 degrees. This can be confirmed by comparison with the outer can 50 which was previously noted as spanning less than 180 degrees. The major arch generally coincides with the long edges 52 of the associated outer can 50. Thus, when the outer cans 50 are brought together to form an annulus, the opposing rubber buffers 66 will initially come into direct contact at their inner bearing surfaces 70 with noticeable gaps at the long edges of the outer cans 50. In this manner, the rubber buffers 66 will compress firstly in the area of the inner bearing surfaces 70 upon assembly, thus constricting about the central torsional section 24 of the stabilizer bar 20, with gaps on either side into which the rubber material flows under compressive loading.

In one example, the inside diameter of the rubber buffer 66 may be designed with a diametrical interference to the stabilizer bar 20, on the order of about 1 mm. This interference will create a compression at the rubber-to-metal interface as the outer cans 50 are brought into concentricity around the stabilizer bar 20. It is contemplated that the rubber buffers 66 are vulcanized prior to assembly with the stabilizer bar 20. Using either a temporary clamp or the bracket 30 itself to maintain compression, the rubber buffer 66 are then bonded (post-vulcanization) to the stabilizer bar 20 with this compression to create confinement of the rubber buffer 66 to the bar 20. The rubber buffers 66 are thus advantageously squeezed around the stabilizer bar 20 by a wedging action which grips the outer surface of the central torsional section 24 with a force that can be precisely engineered to suit the intended application while the bonding operation takes place. In particular, the designer can determine the amount of compression required to achieve the desired bond characteristics and prevent relative motion (i.e., slippage) between the rubber buffer 66 and the exterior interface of the stabilizer bar 20. It is a particular advantage of the present invention that the metal-to-rubber interface between stabilizer bar 20 and rubber buffer 66 is completed with post-vulcanization bonding. I.e., the rubber composition of the rubber buffer 66 is vulcanized prior to being bonded to the stabilizer bar 20. As such, the rubber buffer 66 can if desired be pre-loaded before bonding. Radial compression of the rubber can be used to achieve higher radial stiffness and prevent displacement. Bond quality is expected to increase with clamping pressure during the curing phase, the quality of the metal-to-rubber interface can be controlled because the rubber buffer 66 is already vulcanized. Additionally, little-to-no shrinkage occurs during the bonding process because the rubber buffer 66 is already vulcanized.

Suitable bonding agents include heat activated adhesives and epoxies, such as those marketed by LORD Corporation/Parker-Hannifin Corporation.

To further increase and control torsional stiffness, a rate plate 78 may be embedded within each rubber buffer 66. The rate plate 78 is a curved, rigid sheet-like piece, generally arched about the pocket axis P, as best seen in the cross-sectional view of FIG. 9 and the exploded view of FIG. 5. The rate plate 78 is disposed generally midway between the inner bearing surface 70 and the outer bonded surface 68. Each bushing assembly 28 of the present invention uses two rate plates 78 which divide the torsional strain into multiple shear planes. This has the effect of managing the strain by distribution. The rate plate 78 is preferably mold-bonded to the rubber buffer using a suitable bonding agent, such as a heat activated adhesive or epoxy like those marketed by LORD Corporation/Parker-Hannifin Corporation. The rate plate 78 may, optionally, also include a plurality of anchoring apertures that fill with the rubber buffer 66 during the molding process. The anchoring apertures are visible in FIG. 5 and provide a supplemental mechanical interlock to minimize the risk of rate plate 78 slippage during large angular displacements. As perhaps best seen in FIG. 12, the rate plate 78 substantially separates the rubber buffer 66 into radially inner and radially outer sections. That is to say, the full axial length of rubber is divided by the rate plate 78 via its extension into each of the protruding nose 72 and tail 74 ends. The rate plates 78 divide the torsional strain into multiple shear planes, which has the effect of managing the strain by distribution.

Figure 10:
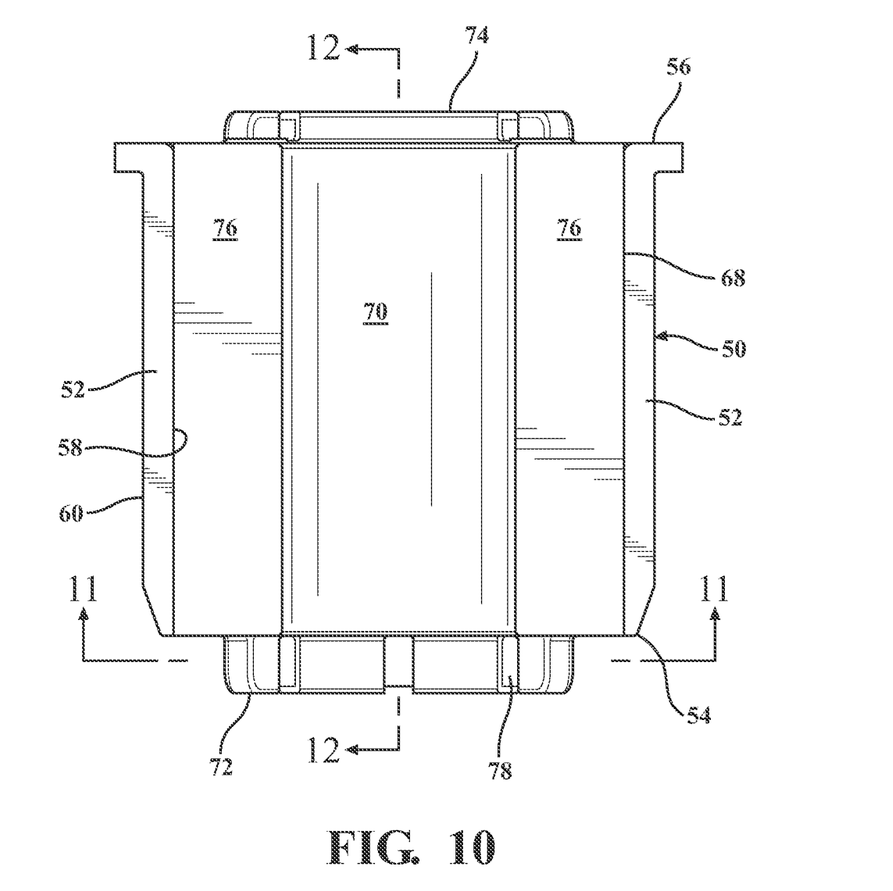
FIG. 10 is a bottom view of the outer can and rubber buffer of FIG. 6.
Figure 11:
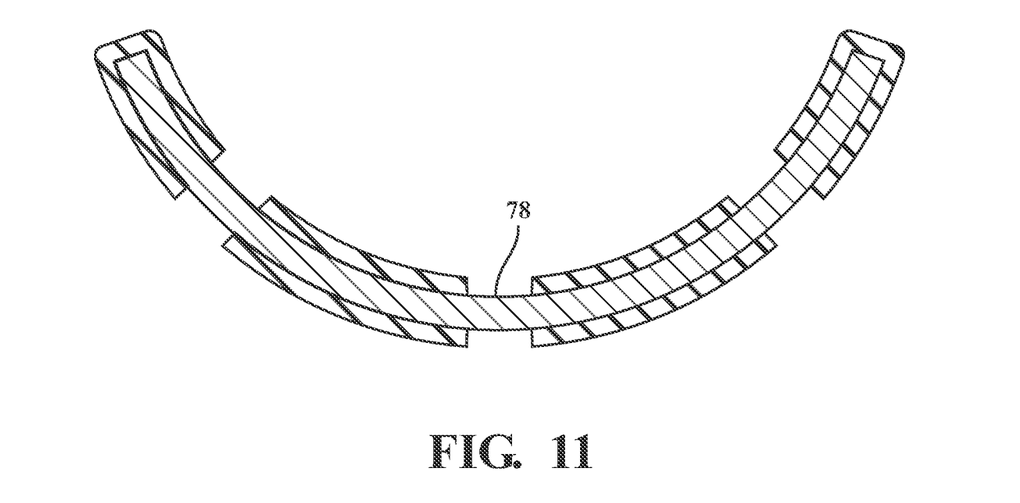
FIG. 11 is a cross-sectional view taken generally along lines 11-11 of FIG. 10.
Figure 12:
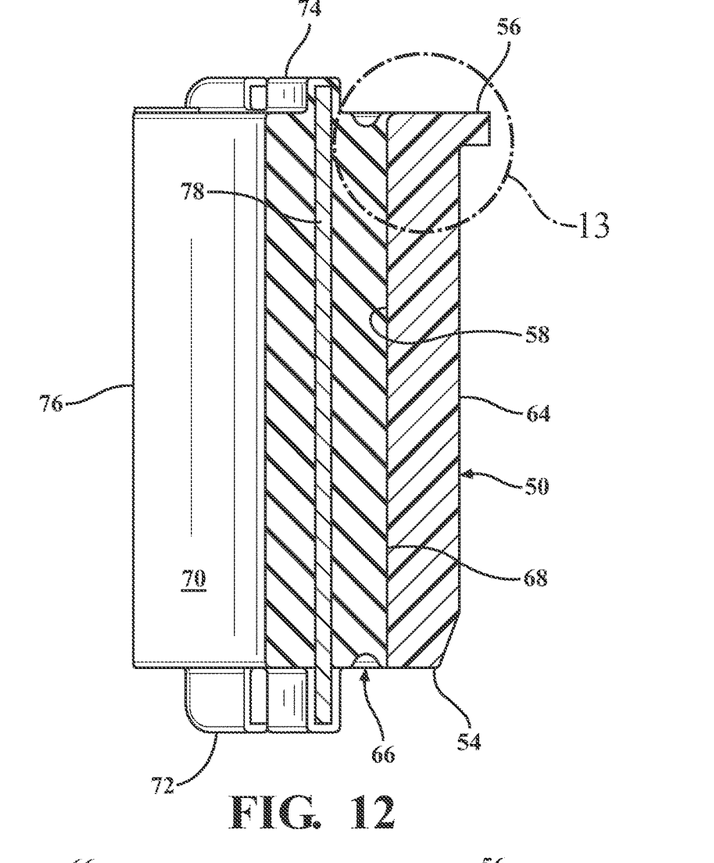
FIG. 12 is a cross-sectional view taken generally along lines 12-12 of FIG. 10.

As part of the manufacturing process in which the rate plate 78 is supported during the molding process, the resulting construction may leave chaplet pins, that is small portions of the ends of the rate plate 78, exposed through the rubber buffer 66 in at least one of the protruding nose 72 and tail 74 ends. For example, FIG. 6 shows two chaplet pins exposed through the nose 72, and FIGS. 10 and 11 show three chaplet pins exposed through the tail 74.

Initial testing of prototypes constructed in the spirit of the illustrated examples has indicated success at meeting radial stiffness over 10,000 N/mm and sustained rotation of +/−32 degrees, while preventing noise due to unwanted slippage. Prior art designs could not achieve high angular displacement combined with high radial stiffness combined with noise abatement. The high radial stiffness of 10,000 N/mm advantageously prevents stabilizer bar 20 deflections and improves stabilizer bar 20 efficiency, while at the same time the rubber buffers 66 allow the bar 20 to twist with large angular displacement.

The present invention is unique in that, as a cantilever design, it incorporates a high radial stiffness bushing assembly 28 that is simply press fit into the bracket 30. Prior art press fit designs utilized steel brackets with very short cantilevers and previous aluminum designs used low stiffness bushings that were mold-bonded to the bracket and did not allow for modular assembly. This present invention offers a unique cantilevered design having a small package envelope for the rubber buffers 66. A typical prior-art D shaped bushing (e.g., FIG. 1) is too large for many newer applications requiring fit in tight spaces. The present invention utilizes circular a bushing assembly 28 that, due to its unique design features, overcomes the problems of high torsional strain and facilitates assembly into the bracket 30.

Moreover, the present invention is particularly unique in that it is able to accommodate several diameters of stabilizer bars. The novel press fit bushing concept is a more efficient package and enables the installer to change the bushing assembly 28 to suit the stabilizer bar while keeping the same brackets 30. Prior art designs that use bushings that are mold-bonded to the bracket 30 cannot adapt to changes in stabilizer bar sizes. The press fit bushing concept of this present invention provides substantially enhanced design flexibility compared with prior art designs.

The post-vulcanization bonded design of the present invention has been found to effectively prevent rubber-to-metal noise. Previous designs that had high articulation had been "slipper" designs which incorporated a fabric liner that intentionally allowed some rotation without inducing rubber strain. These designs are limited due to wear of the fabric. Slipper designs offer only a limited contribution to the torsional rate of the system since they inherently do not transmit torque to the rubber buffer 66 upon slippage. Slipper designs required the majority of the system rate to be generated by the stabilizer bar, thus leading to larger and heavier stabilizer bars.

Moreover, prior art designs known to use a plastic outer can 50 have never been attempted in a cantilevered configuration. The present invention is novel in its use of a plastic outer can 50 combined with features that enable the bushing assembly 28 to stay in position when exposed to foreseeable vehicle loading. Such features include flanges on the trailing end 56 of the outer can 50 that register against the face 36 of the bracket 30. By press fitting the two bushing assemblies 28 (of a typical rear suspension) into their respective brackets 30 from opposite directions, the potential for lateral walkout is minimized. Said another way, in a typical installation having two bushing assemblies 28 stationed along the stabilizer bar 20, the outer cans 50 of one bushing assembly 28 are inserted into their bracket 30 from left-to-right, whereas the outer cans 50 of the other bushing assembly 28 are inserted into their bracket 30 from right-to-left. This also eliminates the need for the stabilizer bar 20 to have metal collars such as those used in prior art designs to hold the bar in position during cross-car loading. Elimination of such metal collars creates additional mass savings. Another feature that enables the bushing assembly 28 to stay in position when exposed to vehicle loading is that the outer cans 50 have anti-rotation lobes 62 which act as keyways 42 to mechanically prevent torsional slip. This plastic keyed design solves the traditional problem of relying on clamping friction to prevent the bushing assembly 28 from rotating inside the bracket 30.

The few prior designs that have rubber buffers post-vulcanization bonded to the stabilizer bar 20 were not capable of sustained operation at high torsional angles. The present invention succeeds where these prior designs failed by incorporating additional confinements created by bond surfaces at the rate plates 78 and at the buffer-to can interfaces 58/68, combined with an external press fit. The rubber buffer 66 is mold bonded to both the rate plate 78 and to the plastic outer can 50. The inside diameter of the rubber buffer 66 is designed with a diametrical interference to the stabilizer bar 20. During a post-vulcanization bonding operation, the rubber buffer 66 is compressed around the stabilizer bar 20 (either with temporary clamps or with the bracket 30) to create confinement of the rubber buffer 66 to the bar 20. An advantage of using temporary clamps is that a specific desired pre-loading value can be achieved that is possibly higher or lower than that offered by the hoop strength of the bracket 30 itself. Testing has shown the design of this invention capable of rotating to 70 degrees (+/−35 degrees) and 140 Nm of torque with no slip— specifications significantly higher than can be achieved with any prior art designs.

Prior art two-piece post-vulcanization bushing designs used traditional D shaped rubber buffers 66 and/or were not carried in cantilevered brackets 30 so they were able to achieve direct compression onto the rubber buffer 66 with the clamp force of external bolts. In contrast, the present invention employs additional pre-compression made possible by designing the assembly as a constrictable system during the bonding operation, and when press fit into the pocket 38 of the bracket 30. In this manner, the rubber buffers 66 are effectively post-vulcanization bonded to the bar 20 via the diametrical interference at the rubber-to-metal interface, thereby creating a unified bar 20 and bushing assembly 28.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A cantilevered bushing assembly for a vehicular stabilizer bar comprising:
    a bracket extending between a head and a foot, said head having a pocket generally centered on a pocket axis,
    at least one outer can slidable into an operative position inside said pocket, said outer can being generally arched about said pocket axis with circumferentially spaced-apart long edges opposing one another to form an annulus, said outer can having a leading end and a longitudinally spaced trailing end, said outer can having an outer surface and a frusto-cylindrical inner surface centered about said pocket axis,
    a rubber buffer associated with said outer can, said rubber buffer having an outer bonded surface affixed to said inner surface of said outer can, said rubber buffer being generally arched about said pocket axis with circumferentially spaced-apart springer ends, said rubber buffer having a frusto-cylindrical inner bearing surface centered about said pocket axis, said inner bearing surface forming an arcuate portion of an interior bushing diameter,
    said pocket having a cylindrical bearing surface interrupted by at least one radially-outwardly bulging keyway, and an anti-rotation lobe formed along said outer surface of said outer can, said anti-rotation lobe received in said keyway.

2. The cantilevered bushing assembly of claim 1, wherein said at least one outer can comprises two outer cans, said pocket having two diametrically opposed said keyways, and each said outer can having one said anti-rotation lobe received in a respective one of said keyways.

3. The cantilevered bushing assembly of claim 2, wherein said springer ends have a skewback.

4. The cantilevered bushing assembly of claim 3, wherein said bracket has opposite faces, said trailing end of said outer can including an outwardly extending flange adapted to directly abut said face of said bracket.

5. The cantilevered bushing assembly of claim 2, wherein the intersection of said inner bearing surface and said springer ends establishes a minor arch, said minor arch spanning greater than 180 degrees, the intersection of said outer bonded surface and said springer ends establishes a major arch, said major arch spanning less than 180 degrees, said major arch generally coinciding with said long edges of the associated said outer can.

6. The cantilevered bushing assembly of claim 2, wherein each said keyway has a smoothly concave shape.

7. The cantilevered bushing assembly of claim 2, wherein said anti-rotation lobe is disposed centrally between said long edges of the associated said outer can, each said anti-rotation lobe having a ridge extending parallel to said pocket axis, a plurality of spurs extending laterally from said ridge, adjacent said spurs separated by intervening draws.

8. The cantilevered bushing assembly of claim 1, further including a rate plate embedded within said rubber buffer, said rate plate being generally arched about said pocket axis.

9. The cantilevered bushing assembly of claim 8, wherein said rate plate is disposed generally midway between said inner bearing surface and said outer bonded surface.

10. The cantilevered bushing assembly of claim 8, wherein said rate plate includes a plurality of anchoring apertures filled with said rubber buffer.

11. The cantilevered bushing assembly of claim 8, wherein said rubber buffer has a nose proximate said leading end of said outer can and a tail proximate said trailing end of said outer can, said nose protruding from said leading end of said outer can, said tail protruding from said trailing end of said outer can.

12. The cantilevered bushing assembly of claim 11, wherein said rate plate is exposed through said rubber buffer at at least one of said protruding nose and tail ends.

13. A cantilevered bushing assembly for a vehicular stabilizer bar comprising:
    a bracket extending between a head and a foot, said head having a pocket generally centered on a pocket axis, said pocket having two diametrically opposed keyways,
    a pair of outer cans slidable into an operative position inside said pocket, each said outer can being generally arched about said pocket axis with circumferentially spaced-apart long edges opposing one another to form a segmented annulus, each said outer can having a leading end and a longitudinally spaced trailing end, each said outer can having an outer surface and a frusto-cylindrical inner surface centered about said pocket axis, each said outer can having an anti-rotation lobe received in a respective one of said keyways,
    a rubber buffer associated with each said outer can, each said rubber buffer having an outer bonded surface affixed to said inner surface of the associated said outer can, each said rubber buffer being generally arched about said pocket axis with circumferentially spaced-apart springer ends, each said rubber buffer having a frusto-cylindrical inner bearing surface centered about said pocket axis, said inner bearing surface forming an arcuate portion of an interior bushing diameter,
    a rate plate embedded within each said rubber buffer, said rate plate being generally arched about said pocket axis,
    wherein the intersection of said inner bearing surface and said springer ends establishes a minor arch, said minor arch spanning greater than 180 degrees, the intersection of said outer bonded surface and said springer ends establishes a major arch, said major arch spanning less than 180 degrees, said major arch generally coinciding with said long edges of the associated said outer can.

14. The cantilevered bushing assembly of claim 13, wherein said bracket has opposite faces, said trailing end of said outer can including an outwardly extending flange adapted to directly abut said face of said bracket.

15. The cantilevered bushing assembly of claim 13, wherein said anti-rotation lobe is disposed centrally between said long edges of the associated said outer can, each said anti-rotation lobe having a ridge extending parallel to said pocket axis, a plurality of spurs extending laterally from said ridge, adjacent said spurs separated by intervening draws.

16. The cantilevered bushing assembly of claim 13, wherein said rate plate is disposed generally midway between said inner bearing surface and said outer bonded surface, said rate plate including a plurality of anchoring apertures filled with said rubber buffer.

17. The cantilevered bushing assembly of claim 8, wherein each said rubber buffer has a nose proximate said leading end of the associated said outer can and a tail proximate said trailing end of said outer can, said nose protruding from said leading end of said outer can, said tail protruding from said trailing end of said outer can, said rate plate being exposed through said rubber buffer at at least one of said protruding nose and tail ends.

18. A combination stabilizer bar and cantilever bushing assembly comprising:
  a stabilizer bar having a central torsional section between opposing control ends, said central torsional section extending along a generally linear longitudinal axis, said central torsional section having a generally circular cross-section centered about said longitudinal axis,
  a cantilever bushing assembly disposed along said central torsional section of said stabilizer bar and configured to anchor said central torsional section in a cantilevered manner relative to a vehicle understructure, said bushing assembly comprising:
  a bracket extending between a head and a foot, said bracket having opposite faces, said head having a pocket generally centered on a pocket axis, said pocket axis generally coincident with said longitudinal axis of said central torsional section, said pocket opening on each of said faces to establish a through hole, said pocket having a cylindrical bearing surface interrupted by a pair of diametrically opposed radially-outwardly bulging keyways, said foot establishing a generally flat mounting base, said foot having at least one mounting hole disposed therethrough and laterally offset from said pocket axis, said bracket being fabricated from a metallic material,
  two outer cans cooperatively slidable into said pocket, each said outer can being generally arched about said pocket axis with circumferentially spaced-apart long edges opposing one another to form a segmented annulus, each said outer can having a leading end and a longitudinally spaced trailing end, each said outer can having an outer surface and a frusto-cylindrical inner surface centered about said pocket axis and terminating at said long edges, each said outer can having one said anti-rotation lobe received in a respective one of said keyways, said outer can being fabricated from a rigid plastic material, and
  a rubber buffer associated with each said outer can, each said rubber buffer having an outer bonded surface directly affixed to said inner surface of the associated said outer can, each said rubber buffer having a frusto-cylindrical inner bearing surface centered about said pocket axis and post-vulcanization bonded to said central torsional section of said stabilizer bar, said inner bearing surface forming an arcuate portion of an interior bushing diameter, said interior bushing diameter being equal to or smaller than said shaft diameter of said torsional section of said stabilizer bar, each said rubber buffer being generally arched about said pocket axis with circumferentially spaced-apart springer ends, the intersection of said inner bearing surface and said springer ends establishing a minor arch, the intersection of said outer bonded surface and said springer ends establishing a major arch, said major arch spanning less than 180 degrees, said major arch generally coinciding with said long edges of the associated said outer can, a rate plate embedded within each said rubber buffer, said rate plate being generally arched about said pocket axis.

19. The combination of claim 18, wherein said leading end of said outer can is tapered, said trailing end of said outer can including an outwardly extending flange adapted to directly abut said face of said bracket, said anti-rotation lobe being disposed centrally between said long edges, each said rubber buffer having a nose proximate said leading end of the associated said outer can and a tail proximate said trailing end of said outer can, said nose protruding from said leading end of said outer can, said tail protruding from said trailing end of said outer can, said rate plate being exposed through said rubber buffer at at least one of said protruding nose and tail ends.

20. The combination of claim 18, wherein each said keyway having a smoothly concave shape, a chamfer formed at the interface of said pocket and at least one of said faces, said at least one mounting hole comprising at least two of said mounting holes extending generally perpendicular to said pocket axis and each offset from said pocket axis toward the same lateral direction, each said mounting hole having a countersink opposite said mounting base, each said anti-rotation lobe having a ridge extending parallel to said pocket axis, a plurality of spurs extending laterally from said ridge, adjacent said spurs separated by intervening draws, said rate plate disposed generally midway between said inner bearing surface and said outer bonded surface, said rate plate including a plurality of anchoring apertures filled with said rubber buffer.

\* \* \* \* \*